(12) United States Patent
Dong

(10) Patent No.: US 10,705,415 B2
(45) Date of Patent: Jul. 7, 2020

(54) PROJECTOR DEVICE

(71) Applicant: QINGDAO HISENSE LASER DISPLAY CO., LTD., Qingdao, Shandong (CN)

(72) Inventor: Shubin Dong, Shandong (CN)

(73) Assignee: QINGDAO HISENSE LASER DISPLAY CO., LTD., Shandong (CN)

( * ) Notice: Subject to any disclaimer, the term of this patent is extended or adjusted under 35 U.S.C. 154(b) by 0 days.

(21) Appl. No.: 16/287,788

(22) Filed: Feb. 27, 2019

(65) Prior Publication Data

US 2019/0384146 A1 Dec. 19, 2019

Related U.S. Application Data

(63) Continuation of application No. PCT/CN2018/107589, filed on Sep. 26, 2018.

(30) Foreign Application Priority Data

Jun. 19, 2018 (CN) .......................... 2018 1 0632465
Jun. 19, 2018 (CN) .......................... 2018 1 0632481
Jun. 18, 2019 (CN) .......................... 2018 1 0628588

(51) Int. Cl.
*G03B 21/16* (2006.01)
*H04N 9/31* (2006.01)
(Continued)

(52) U.S. Cl.
CPC ............. *G03B 21/16* (2013.01); *G02B 7/028* (2013.01); *G03B 21/008* (2013.01); *H04N 9/3144* (2013.01)

(58) Field of Classification Search
CPC ....... G03B 21/16; H04N 9/3144; G02B 7/028
(Continued)

(56) References Cited

U.S. PATENT DOCUMENTS 4,948,221 A 8/1990 Yates
7,334,951 B2 2/2008 Senba et al.
(Continued)

FOREIGN PATENT DOCUMENTS

CN 2386468 Y 7/2000
CN 1652677 A 8/2005
(Continued)

OTHER PUBLICATIONS

First Office Action cited in Chinese Patent Application No. 201810632465.7 (6 pages), dated Oct. 9, 2019, and English translation (8 pages).
(Continued)

*Primary Examiner* — Ryan D Howard
(74) *Attorney, Agent, or Firm* — Brinks Gilson & Lione

(57) ABSTRACT

A projector device includes a housing, an optical modulation element provided in the housing, a lens tube with lenses provided inside, and a heat conducting component. A first side wall of the housing is provided with a through hole. The lens tube is nested in the through hole, and a first end of the lens tube is located in the housing and receives lights emitted from the optical modulation element. A first end of the heat conducting component is disposed on an outer wall of a first end of the lens tube, and a second end of the heat conducting component is connected with the housing.

19 Claims, 8 Drawing Sheets

(51) Int. Cl.
*G03B 21/00* (2006.01)
*G02B 7/02* (2006.01)

(58) Field of Classification Search
USPC .......................................................... 359/820
See application file for complete search history.

(56) References Cited

U.S. PATENT DOCUMENTS

| | | |
|---|---|---|
| 2005/0162761 A1 | 7/2005 | Hargis et al. |
| 2006/0067678 A1 | 3/2006 | Senba et al. |
| 2007/0091278 A1 | 4/2007 | Zakoji et al. |
| 2010/0059664 A1 | 3/2010 | Aiba |
| 2010/0097579 A1 | 4/2010 | Hsieh et al. |
| 2011/0025986 A1* | 2/2011 | Ko .................. G03B 21/16 353/57 |
| 2014/0055670 A1 | 2/2014 | Hongo |
| 2017/0031127 A1 | 2/2017 | Tsuchiya et al. |

FOREIGN PATENT DOCUMENTS

| | | |
|---|---|---|
| CN | 101452099 A | 6/2009 |
| CN | 101630115 A | 1/2010 |
| CN | 101674406 A | 3/2010 |
| CN | 101726819 A | 6/2010 |
| CN | 201628800 U | 11/2010 |
| CN | 102809879 A | 12/2012 |
| CN | 103634514 A | 3/2014 |
| CN | 105182670 A | 12/2015 |
| JP | 10-161242 A | 6/1998 |
| JP | 2005-331791 A | 12/2005 |
| JP | 2006-195382 A | 7/2006 |
| JP | 2007-158779 A | 6/2007 |
| JP | 2009-258490 A | 11/2009 |
| TW | 201104340 A | 2/2011 |

OTHER PUBLICATIONS

Second Office Action cited in Chinese Patent Application No. 201810628588.3 (10 pages), dated Oct. 23, 2019, and English translation (14 pages).

First Office Action cited in Chinese Patent Application No. 201810628588.3 (7 pages) and English translation (14 pages).

First Office Action cited in Chinese Patent Application No. 201810632481.6 dated Apr. 15, 2020 with English Translation, 16 pages.

* cited by examiner

PROJECTOR DEVICE

CROSS-REFERENCE TO RELATED APPLICATIONS

This application is a continuation of International Application No. PCT/CN2018/107589, entitled "Projector Device", submitted on Sep. 26, 2018, which claims priority to Chinese Patent Application No. 201810632465.7, titled "Projector Device", Chinese Patent Application No. 201810632481.6, titled "Projector Device", and Chinese Patent Application No. 201810628588.3, titled "Projector Device", each of which was submitted to the Chinese patent office on Jun. 19, 2018. Each of these applications is hereby incorporated by reference in its entirety.

TECHNICAL FIELD

The present disclosure relates to a technical field of projection, and more particularly to a projector device.

BACKGROUND

At present, owing to the advantages of large size and good display performance for projecting images, various projector devices such as laser televisions and projectors have gained more and more extensive application.

The projector device mainly includes a set of optical components, lenses, etc. The optical components, also called an optical engine, typically include a Digital Micro Mirror Device (DMD) and other constituent parts inside, mainly for emitting lights. The lens, typically including a plurality of groups of lens elements, can refract lights emitted from the DMD by combining the lens elements inside the lens to generate an image. The lens elements are mounted in a lens tube made of a material such as plastic, and one end of the lens tube is connected to the optical components, and the other end is used for emitting lights, thereby imaging a picture. To prevent the projector device from being affected by an external environment, the lens and the optical components are typically connected in an air-tight manner.

SUMMARY

In one aspect, the embodiments of the present disclosure provide a projector device, including a housing, an optical modulation element located in the housing, a lens tube with lenses provided inside, and a heat conducting component. A first side wall of the housing is provided with a through hole. The lens tube is nested in the through hole, and a first end of the lens tube is located in the housing and configured to receive lights emitted from the optical modulation element. A first end of the heat conducting component is disposed on an outer wall of the first end of the lens tube, and a second end of the heat conducting component is connected with the housing.

In another aspect, the embodiments of the present disclosure disclose a projector device, including a metal housing, a Digital Micro Mirror Device (DMD) located in the metal housing, a plastic tube with lenses inside, and a metal heat conducting component. A first side wall of the metal housing is provided with a through hole. The plastic tube is nested in the through hole. The DMD is disposed on an inner side of a second side wall of the metal housing. The first side wall is disposed in opposition to the second side wall. The DMD is configured to modulate light beams that irradiate on the DMD to generate an imaging beam. A first end of the plastic tube is located in the housing and configured to receive the imaging beam emitted from the DMD. A second end of the plastic tube is located outside the housing. A first end of the metal heat conducting component is disposed on an outer wall of the first end of the plastic tube, and a second end of the metal heat conducting component is connected with the first side wall of the metal housing.

In another aspect, the embodiments of the present disclosure disclose a projector device, including a metal housing, a Digital Micro Mirror Device (DMD) located in the metal housing, a plastic tube with lenses inside, and a metal heat conducting component. A first side wall of the metal housing is provided with a through hole, and the plastic tube is nested in the through hole. The DMD is disposed on an inner side of a second side wall of the metal housing, and the first side wall is disposed in opposition to the second side wall. The DMD is configured to modulate light beams that irradiate on the DMD to generate an imaging beam. A first end of the plastic tube is located in the housing and an opening of the first end of the plastic tube is configured to receive the imaging beam emitted from the DMD, a second end of the plastic tube is located outside the housing. A first end of the metal heat conducting component is disposed around part of the first end of the plastic tube, and a second end of the metal heat conducting component is connected with an outer surface of the first side wall of the metal housing. The first end of the metal heat conducting component is substantially extend along the axis of the plastic tube, and the second end of the metal heat conducting component is substantially extend vertical to the axis of the plastic tube.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

To make the objective, technical solutions and advantages in the embodiments of the present disclosure clear, the technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
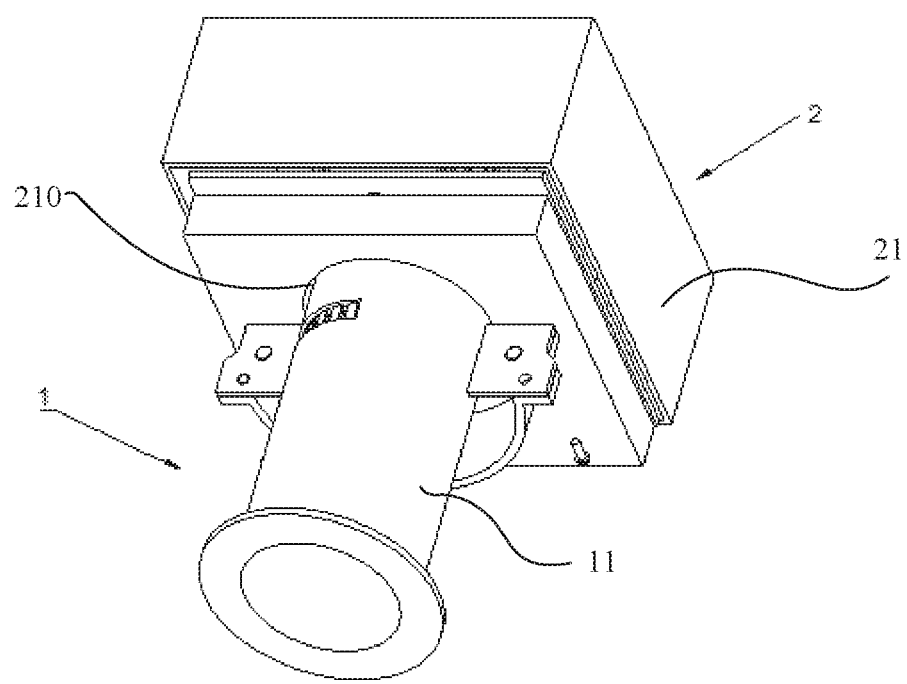
FIG. 1 is a schematic diagram of a projector device provided in some embodiments of the present disclosure.
Figure 2A:
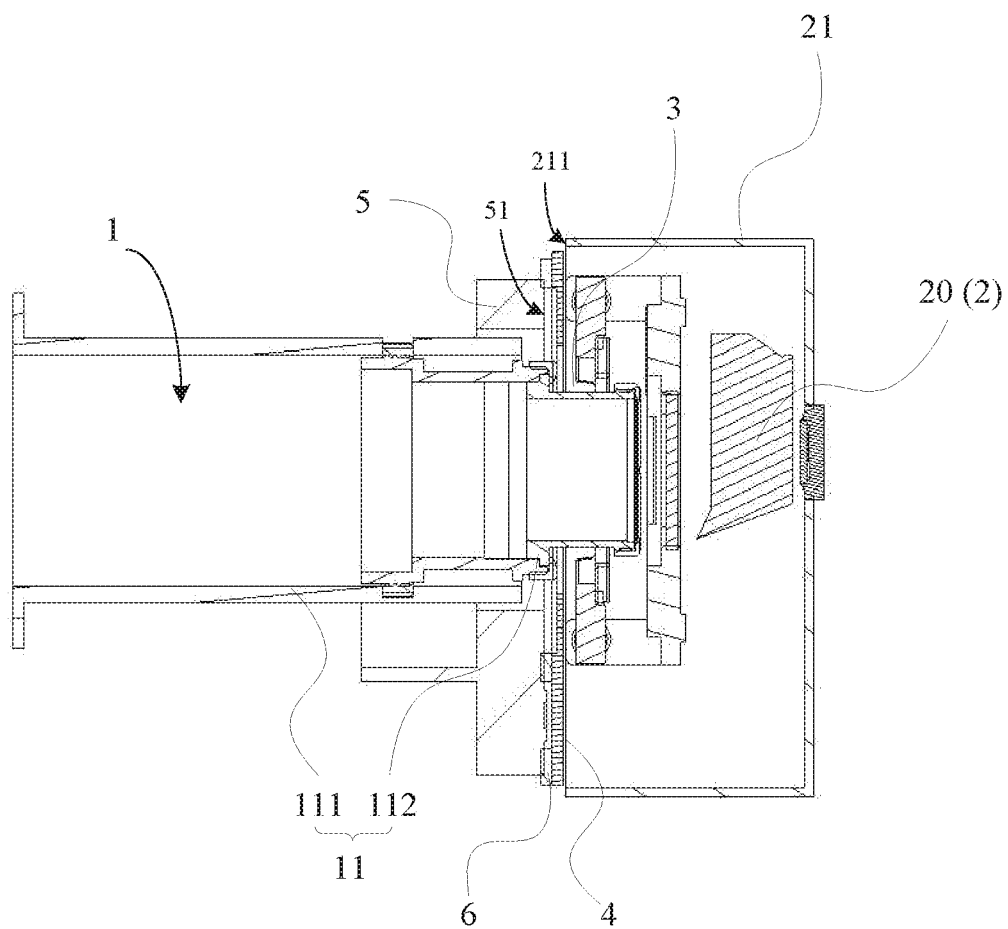
FIG. 2a is a schematic sectional view of a projector device provided in some embodiments of the present disclosure.
Figure 2B:
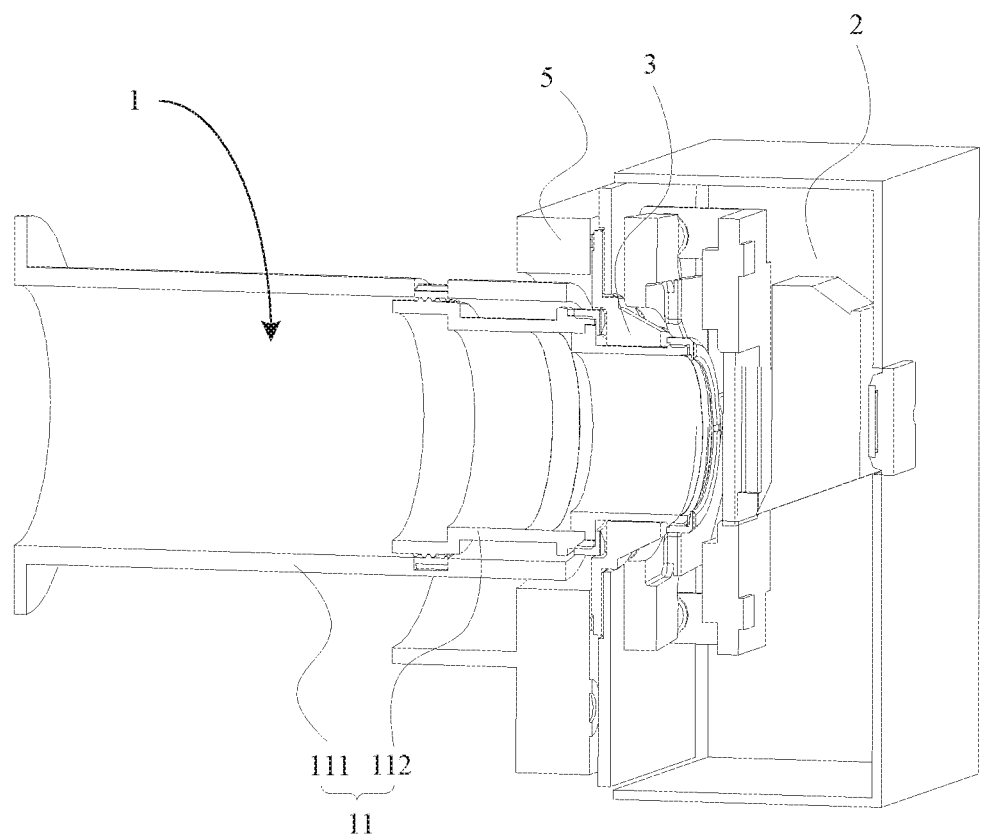
FIG. 2b is a schematic structural diagram of a projector device provided in some embodiments of the present disclosure.
Figure 3:
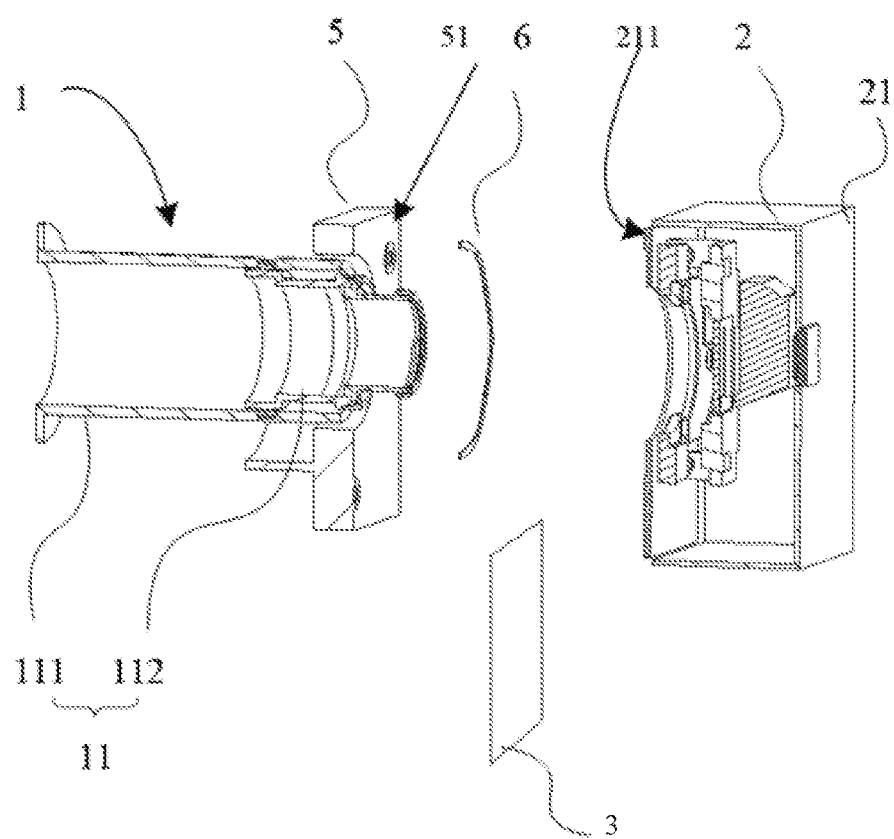
FIG. 3 is a schematic exploded view of a projector device provided in some embodiments of the present disclosure.
Figure 4:
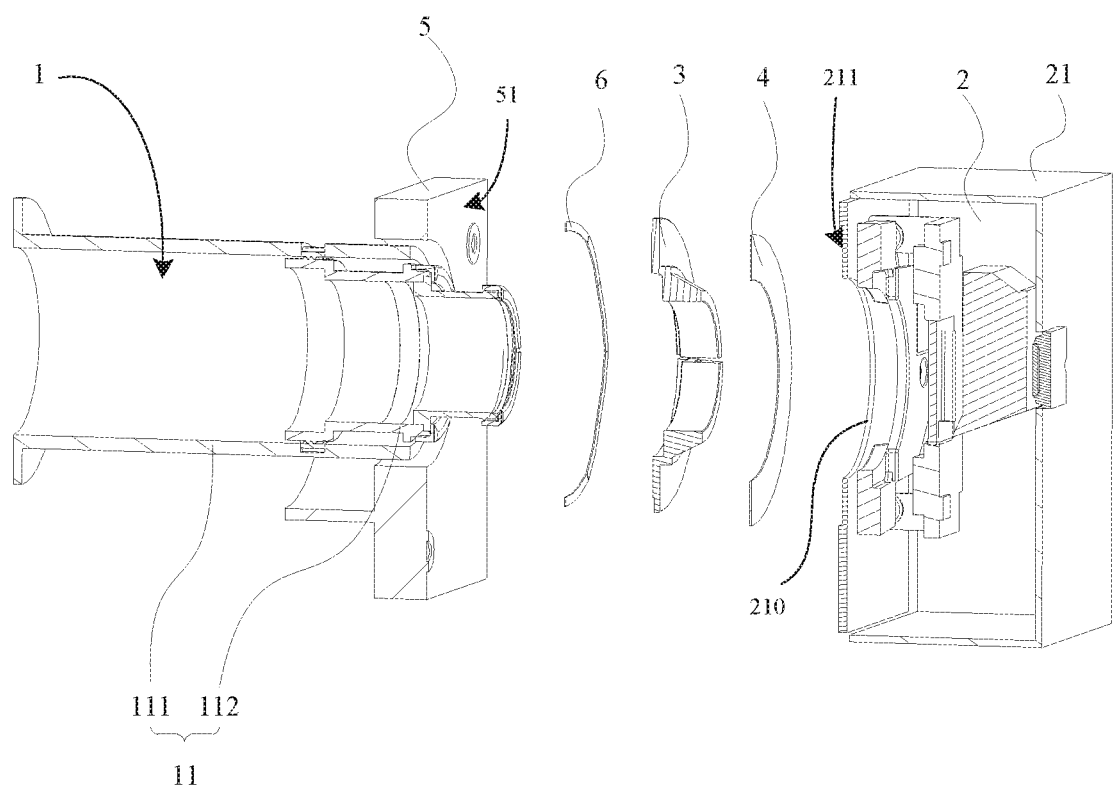
FIG. 4 is a schematic exploded view of another projector device provided in some embodiments of the present disclosure.
Figure 5:
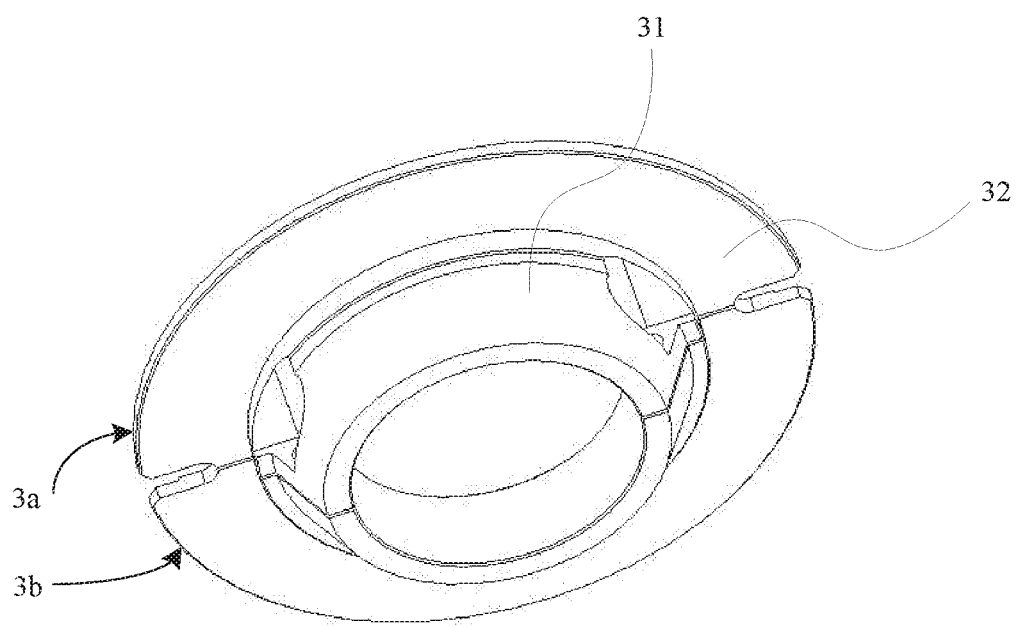
FIG. 5 is a schematic structural diagram of a heat conducting component provided in some embodiments of the present disclosure.

FIG. 1 is a schematic diagram of a projector device provided in some embodiments of the present disclosure. FIG. 2a is a schematic sectional view of a projector device provided in embodiments of the present disclosure. FIG. 2b is a schematic structural diagram of a projector device provided in embodiments of the present disclosure. FIG. 3 is a schematic exploded view of a projector device provided in some embodiments of the present disclosure. FIG. 4 is a schematic exploded view of another projector device provided in embodiments of the present disclosure. FIG. 5 is a schematic structural diagram of a heat conducting component provided in in some embodiments of the present disclosure.

As shown in FIGS. 1-5, embodiments of the present disclosure provide a projector device, including a housing 21, an optical modulation element 20 provided in the housing 21, a lens tube 11 with lenses provided inside, and a heat conducting component 3. A first side wall of the housing 21 is provided with a through hole 210. A first end of the lens tube 11 is nested in the through hole 210 and configured to receive lights emitted from the optical modulation element 20. One end of the heat conducting component 3 is disposed on an outer wall of the first end of the lens tube 11, and the other end of the heat conducting component 3 is connected with the housing 21. The optical modulation element modulates lights that irradiate the optical modulation element to form an imaging light for displaying image, and the imaging light may generate an image by projecting on a screen via the lens.

As shown in FIG. 5, the heat conducting component 3 may include at least one heat conductive heat conductor 3a, 3b arranged around at least a part of a periphery of an outer wall of the lens tube 11. A first end of the heat conductor 3a, 3b contacts the outer wall of the lens tube 11, and is used for receiving heat from a lens component 1, a second end of the heat conductor 3a, 3b extends outward along a radial direction of the lens component 1 and gets in touch with the housing 21, and conducts heat of the lens component 1 to the housing 21. When the projector device is in operation, some heat energy is generated when lights pass through the lens. The lens are easily deformed when the heat energy is accumulated on the lens, lead to a changing refractive indexes of different portions of the lens, causing a "temperature drift" phenomenon, and affecting the final imaging picture. The projector device provided in the present embodiment conducts heat generated at the lens to a heat dissipating structure through the heat conducting component 3, and dissipates the heat via the heat dissipating structure, which may reduce the above "temperature drift" phenomenon. The heat dissipating structure may be the housing 21 of the optical modulation element.

As shown in FIGS. 1, 2, and 5, in some embodiments of the present disclosure, the projector device includes a lens component 1, a set of optical components 2, and a heat conducting component 3. The lens component 1 includes a lens tube 11 and a plurality of groups of lens elements disposed in the lens tube 11 (not shown in the drawings). The optical components 2 include a heat dissipating structure. The heat conducting component 3 may be connected, for example, between the outer wall of the lens tube 11 and the heat dissipating structure. The heat conducting component 3 receives heat from the lens component 1, and conducts heat of the lens component 1 to the heat dissipating structure of the optical components 2. The heat dissipating structure may be, for example, the housing 21 provided by the optical components 2.

The projector device typically may be a laser TV, a projector, or other device capable of projecting images. To project images, the projector device includes a set of optical components 2. The optical components 2, also typically called an optical engine, include a digital micromirror device (DMD), a lighting path at a front end, and other components. The lighting path may provide lights as a light source. The DMD is filled with micro optical shutters or lighting path switches, and therefore can turn on or turn off the lighting path. Thus, lights emitted from the lighting path are passed through selectively to form an image screen. The optical components 2 further include a housing 21 used for air tight protection. In some embodiments, the housing 21 is produced from a heat conductive material like metal.

In order to focus and zoom the light emitted from the optical components 2 and projected a normally displayed picture on the projection screen, the projector device further includes a lens component 1. The lens component 1 includes a lens tube and a plurality of groups of lens elements disposed in the lens tube, and each group of lens elements includes one or more lens elements. Thus, light emitted from the optical components 2 may be focused on the projection screen through refraction of different lenses, thereby displaying normal images with a needed size or sharpness. The purpose for arranging the lens tube is to fix the lens elements. Thus, a plurality of lens elements may be fixed in the lens tube 11 with a preset interval, so as to refract the light of the image.

Generally the lens component 1 is at least partially connected with the optical components 2 in an air-tight manner, and out of consideration of reducing the cost and weight, the lens tube 11 is usually made from a light material with a poor heat dissipation performance such as, for example, plastic. Therefore, when the projector device is in operation, heat produced by the lens element 11 in the lens component 1 when the lens element 11 passes through lights is usually hard to dissipate, the lens element 11 may be deformed due to excessive heat accumulated on the lens element 11, thus affecting the imaging effect of the projected picture. Therefore, to dissipate heat of the lens component 1, the projector device further includes a heat conducting component 3. The heat conducting component 3 is connected between the outer wall of the lens tube 11 of the lens component 1 and the heat dissipating structure of the optical components 2, and therefore may be used as a heat conducting medium to conduct heat of the lens tube 11 to the heat dissipating structure, so as to dissipate heat of the lens component 1.

A heat dissipating structure usually has a large size and is located at a position where it is easy to exchange heat with the outside. For example, the heat dissipating structure may be a heat dissipating fin or a metal housing. In another example, the heat dissipating structure may be the housing 21 of the optical components 2. Heat may be dissipated rapidly by virtue of the advantage of using the housing 21 as a metal part, which may eliminate or reduce the need for additionally arranging a separate special heat dissipating structure. Alternatively, the heat dissipating structure may be another structure in the optical components 2. The present disclosure does not limit the specific structure and the mounting position of the heat dissipating structure, and it is available as long as it has the function of heat dissipation. Similarly, the present disclosure does not limit the specific structure and the mounting position of the heat conducting component, and it is available as long as it can conduct the heat produced at the lens component 1 to the heat dissipating structure. Unless otherwise stated, the following description is made for the example that the heat dissipating structure is the housing 21 of the optical components 2.

In some embodiments, to implement fastening, heat dissipation and air-tightness of the optical modulation element (such as DMD imaging element or liquid crystal on silicon (LCOS) imaging element), the optical modulation element is usually disposed on an inner wall of the housing 21, and the housing 21 is made from a metal material to facilitate heat dissipation. A through hole 210 is arranged on a side wall of the housing 21 opposite to the inner wall provided with an optical modulation element, and the lens tube probes into the housing 21 through the through hole 210. The lens tube 11 in the lens component 1 usually partially extends into the optical components 2, while the lens tube 11 is used to install a rear lens group. The rear lens group is close to the DMD of a DLP projector device, receiving beams reflected by the DMD at the earliest time, and is easy to generate and accumulate heat. In addition, a portion of the lens tube 11 that extends into the optical components 2 is surrounded by the housing of the optical components 2 to form an enclosed space, and this portion produces a large amount of heat owing to the irradiation. Therefore, so much heat is hard to dissipate from the enclosed space, causing a poor heat dissipating performance. To solve this problem, in some embodiments of the present disclosure, the outer wall of the lens tube 11 that extends into the optical components 2 is connected with the heat conducting component 3, while the heat conducting component 3 is then connected with the heat conductive heat dissipating structure of the optical components 2. In some embodiments, the outer wall of the lens tube 11 that probes into the housing 21 is connected with the housing 21 via the heat conducting component 3, thus heat of this portion can be transferred to the housing 21 to effectively reduce the heat accumulated at this portion of the lens tube 11, leading to a good heat dissipating effect.

An outer periphery or end face of the lens tube 11 may be provided with accessories like a lens hood. Thus an outer end portion of the lens tube 11 usually has a large outer diameter, resulting in difficulty in mounting the heat conducting component 3. In some embodiments of the present disclosure, as shown in FIG. 5, to fasten the heat conducting component 3 on the lens tube 11, the heat conducting component 1 may include at least two heat conductors 3a, 3b arranged jointly around at least a part of the periphery of the outer wall of the lens tube 11. Thus, the at least two heat conductors 3a, 3b in the heat conducting component 3 are attached to different positions on the periphery of the outer wall of the lens tube 11, convenient to install and possibly reducing or eliminating the need to set in from the end portion of the lens tube 11. The two heat conductors 3a, 3b can exchange heat with the outer wall of the lens tube 11 in multiple different directions to improve the heat dissipating efficiency. In some embodiments, a removable connection exists between the heat conductors 3a, 3b. Therefore, the heat conductors 3a, 3b can be mounted in different directions of the lens tube 11, being spliced together on the outer side of the lens tube 11. These heat conductors are connected with each other, such that the circumference of the lens tube 11 is connected with the heat conducting component 3 and gets effective heat dissipation.

Removable connection such as engaging connection and threaded connection may be made between different heat conductors in the manners commonly used by those skilled in the art, which is not limited here. The following description is made for the example that a plurality of heat conductors are connected with each other through threaded fasteners: positioning holes may be arranged on both ends of each heat conductor, and the positioning holes may be unthreaded holes or threaded holes. After two adjacent heat conductors are spliced, they can be fastened together by putting a threaded fastener into the positioning hole and screwing.

The heat conductor may be directly connected to the lens tube 11. In this case, a fixed structure for relatively fixing the lens tube 11 and the heat conductor is provided. For example, a protrusion and a groove that can be engaged with each other may be arranged on the lens tube 11 and the heat conductor respectively, to install the heat conductor on a specified position of the lens tube 11. As stated above, to connect with the lens tube in the lens component 1, the heat conducting component 3 typically may be of multiple shapes and structures. For example, the heat conducting component 3 may be a separate part or composed by a plurality of parts. For example, as an optional structure, the heat conducting component 3 may include an annular heat conductor. In this case, the annular heat conductor in the heat conducting component 3 may be sleeved in the lens tube, for example, on the outer wall of the rear lens tube 112, to transfer the heat of the lens tube to the housing 21 of the optical components 2.

An inner wall of the heat conductor may match the outer wall of the lens tube 11 in size. In this way, the inner wall of the heat conductor will be in contact with the outer wall of the lens tube 11, so that good contact may be achieved between the outer wall of the lens tube 11 and the heat conductor, so that the heat on the lens tube 11 may be transferred to the heat conductor efficiently.

The first end of the heat conductor contacts the outer wall of the lens tube 11, and is used to receive heat from the lens component 1, while the second end of the heat conductor extends outward along a radial direction of the lens component 1, and conducts the heat of the lens component 1 to a heat dissipating structure, for example, the housing 21. Thus, an effective and reliable heat conducting path may be formed between the lens component 1 and the heat dissipating structure using the heat conductor as a heat conducting medium, thus ensuring that the heat on the lens tube 11 is dissipated effectively. The first end of the heat conductor is usually in contact with the outer wall of the lens tube 11, and extends in a direction parallel to an axial direction of the lens along the outer wall of the lens tube to form a first heat conducting section. The first heat conducting section usually has a large contact surface to improve the heat conduction efficiency between the heat conductor and the lens tube 11. The second end of the heat conductor that extends outward may be connected with the heat dissipating structure directly or indirectly, and forms heat conduction with the heat dissipating structure to conduct the heat from the lens tube 11 to the heat dissipating structure. As shown in FIG. 5, the heat conductor may include a first heat conducting section 31 arranged around the outer wall of the lens tube 11 along a circumferential direction of the lens tube 11, and a second heat conducting section 32 that extends outward along the radial direction of the lens component 1. The second heat conducting section 32 is disposed on one end of the first heat conducting section 31 close to the housing 21 (i.e., one side of the first heat conducting section 31 close to the side wall provided with the through hole 210), the second heat conducting section 32 is in contact with an inner side or an outer side of the side wall provided with the through hole 210, such that, for example, heat conduction exists between the second heat conducting section 32 and the heat dissipating structure. In some embodiments, the heat conductor may be made from a metal material. The first heat conducting section 31 of the heat conductor is mainly for contacting the outer wall of the lens tube 11 to absorb the heat on the lens tube 11, and the second heat conducting section 32 is mainly for contacting the housing 21 of the optical components 2 to transfer the heat to the housing 21. The first heat conducting section 31 is arranged around the outer wall of the lens tube 11 along a circumferential direction, and usually extends along an axial direction of the lens component 1 to have good contact with the lens tube 11, thus facilitating heat conduction. The second heat conducting section 32 stretches along the radial direction of the lens component 1, i.e., perpendicular to the extending direction of the first heat conducting section 31, thereby being connecting to the housing 21 outside the lens tube 11. In the present disclosure, "horizontal", "perpendicular" and the like shall all be construed as "substantially horizontal", "substantially perpendicular", while permitting some deviation here.

In some embodiments, as shown in FIG. 4, the first heat conducting section 31 protrudes toward a direction where the optical modulation element is located relative to the second heat conducting section 32, an inner surface of the first heat conducting section 31 matches the outer wall of the lens tube 11, and an outer surface of the first heat conducting section 31 is presented as chamfer relative to a surface of the second heat conducting section 32 facing the optical shutter. This design tightens the binding between the heat conducting element 3 and the through hole 210 on the housing, which is favorable for the air-tightness of the optical modulation element.

In some embodiments, the lens elements in the lens component 1 are usually divided into many groups. For example, the lens elements may be divided into a front group and a rear group, or a front group, an intermediate group, and a rear group. Each group typically includes a plurality of lenses, for example, spherical lenses or aspherical lenses. Accordingly, there may be a plurality of lens tubes in the lens component 1, and lenses in different groups may be placed in different regions of the lens tube. In zoom lenses, the front group of lenses is typically located at an outmost side of the lens tube of the projector device, usually being not adjustable, and the rear group of lenses, or the rear group and the intermediate group of lenses may be moved to complete the focus length adjustment. Therefore, as an embodiment, as shown in FIG. 2b, the lens tube of the lens component 1 may include a front lens tube 111 and a rear lens tube 112, wherein the heat conducting component 3 is connected with the rear lens tube 112.

The front lens tube 111 is usually located on a front end of the lens component 1, being the position of the lens tube away from the optical components 2, while the rear lens tube 112 is located on a rear end of the lens component 1, that is, one end of the lens tube close to the optical components 2. The rear lens tube 112 can move forwards and backwards along an axis of the lens component 1, i.e., along a direction of the light axis, to change a relative distance between the lenses in the front lens tube 111 and the lenses in the rear lens tube 112, thus implementing the focusing function. The rear lens tube 112 is arranged close to the optical components 2.

On the one hand, the lenses in the rear lens tube 112 are largely affected by light irradiation due to a short distance to the optical modulation element, causing a rapid temperature rise; on the other hand, the rear lens tube 112 is close to the optical components 2, and the end of the rear lens tube 112 close to the optical shutter is at least partially shielded by the housing 21 of the optical components 2, making the heat thereon hard to dissipate. Therefore, by connecting the heat conducting component 3 with the rear lens tube 112, heat of the rear lens tube 112 may be dissipated, thus avoiding accumulation of heat and ensuring normal imaging of the lenses.

In some other embodiments, the lens component 1 may also include a front lens tube, an intermediate lens tube, and a rear lens tube, and the rear lens tube is usually connected with the heat conducting component 3 to dissipate heat. The specific structure thereof is similar to that of the above-mentioned lens component 1 comprising two lens tubes, which is not elaborated here.

To connect the lens tube in the lens component 1, the heat conducting component 3 usually may be of multiple shapes and structures. For example, the heat conducting component 3 may be a separate part or composed by a plurality of parts. For example, the heat conducting component 3 includes a separate annular heat conductor. In this case, the annular heat conductor in the heat conducting component 3 may be sleeved in the lens tube, for example, on the outer wall of the rear lens tube 112 to transfer the heat of the lens tube to the housing 21 of the optical components 2.

In some embodiments, an inner wall of the heat conductor matches the outer wall of the lens tube 11 in size. Thus the inner wall of the heat conductor is in contacted with the outer wall of the lens tube 11, causing good contact between the outer wall of the lens tube 11 and the heat conductor, such that the heat on the lens tube 11 is transferred to the heat conductor efficiently. The heat conductor usually extends outward along a radial direction, and the portion extending outward may connect to the housing 21 of the optical components 2, and transfers the heat from the lens tube 11 to the housing 21. Thus, the heat conductor is used as a heat conducting medium to implement the heat conduction between the lens tube 11 and the housing 21, so that the lens barrel 11 is effectively dissipated. Different lens tubes in the lens component 1 have different outer diameters and positions, and unless otherwise stated, the following description is made for the example that the heat conducting component 3 is connected with the rear lens tube 112.

To match the shape of the lens tube 11, the heat conductors in the heat conducting component 3 may be joined together and may be spliced into an annular piece. Since there are a plurality of heat conductors in the heat conducting component 3, these heat conductors may be installed in different directions of the rear lens tube 112, and jointly constitute an annular piece surrounding the outer side of the rear lens tube 112. Thereby circumference of the rear lens tube 112 may be connected to the heat conducting component 3, and the rear lens tube 112 is effectively dissipated.

As shown in FIG. 5, when a plurality of heat conductors are spliced into an annular piece, the heat conducting component 3 may include a first heat conductor 3a and a second heat conductor 3b. The first heat conductor 3a and the second heat conductor 3b are substantially semi-annular, and may be spliced into an annular piece.

The first heat conductor 3a and the second heat conductor 3b are both semi-annular. The first heat conductor 3a and the second heat conductor 3b may be spliced into a complete ring when the first heat conductor 3a and the second heat conductor 3b are arranged face to face and the ends of the first heat conductor 3a are correspondingly connected with the ends of the second heat conductor 3b. The size of the inner wall of the first heat conductor 3a and the size of the inner wall of the second heat conductor 3b may be made both to match the size of the outer diameter of the rear lens tube 112. Thus, a ring which contacts the outer wall of the rear lens tube 112 is formed when the first heat conductor 3a and the second heat conductor 3b are both fixed on the outer wall of the rear lens tube 112, and the ring may conduct and dissipate heat of the rear lens tube 112.

The shapes of the first heat conductor 3a and the second heat conductor 3b may be the same or different. The first heat conductor 3a and the second heat conductor 3b are both semi-rings with an central angle of 180° when the first heat conductor 3a and the second heat conductor 3b have a same shape; thus, the first heat conductor 3a and the second heat conductor 3b may be arranged at both sides of the rear lens tube 112 equivalently. When the first heat conductor 3a and the second heat conductor 3b are of different shapes, they are generally complementary in shape, so that they may form a complete ring just after they are joined together.

Since so much heat is usually accumulated on the rear lens tube 112, in some embodiments, the second heat conducting section 32 is usually arranged around the outer wall of the rear lens tube 112, thereby absorbing and transmitting heat from the rear lens tube 112.

In some embodiments of the present disclosure, the lens component includes at least two lens tubes comprising at least one lens tube with a variable axial position, for example, typically the rear lens tube 112. In this example, the heat conducting component 3 is connected between the outer wall of the lens tube with a variable axial position and the heat dissipating structure (e.g., the housing 21), and the heat conducting component is configured as follows: a first end of the heat conducting component 3 typically maintains a thermal conductive connection with the outer wall of the lens tube with a variable axial position, and a second end of the heat conducting component typically maintains a thermal conductive connection with the heat dissipating structure such as the housing when the lens tube with a variable axial position moves along the axial direction. Thus, heat on the lens of the projector device may be dissipated while the lens is normally focused.

In some embodiments, the relative positions of the front lens tube 112 and the housing 21 remain unchanged, and the relative positions of the heat conducting component 3 and the housing 21 remain unchanged when the rear lens tube 112 moves. The first heat conducting section 31 of the heat conducting component 3 is sleeved in and slideably contacts the rear lens tube 112 to to achieve heat-dissipating contact with the rear lens tube 112. In some embodiments, when the rear lens tube 112 moves back and forth, the heat conducting component 3 will also move accordingly. To enable the heat conducting component 3 to move back and forth with the focusing of the lens component 1, the heat conducting component 3 is configured to be able to move back and forth with the rear lens tube 112. In some embodiments, between a lens base 5 and the housing 21 of the optical components 2, a gap is reserved for the heat conducting component 3 to move back and forth.

In some embodiments, since the rear lens tube 112 may be moved and the heat conducting component 3 moves with the rear lens tube 112, the second heat conducting section 32 and the housing 21 of the optical components 2 are usually not directly connected, but indirectly connected using a thermal conductive spacer or a thermal conductive medium. The heat on the rear lens tube 112 may be transferred to the housing 21 via the heat conductor as long as heat conduction between the second heat conducting section 32 and the housing 21 is ensured.

In some embodiments, the thermal conductive spacer includes a deformable thermal conductive spacer. In this way, on the one hand, the heat conducting component 3 may keep contact with the heat dissipating component, such as the housing 21 to complete heat transfer; on the other hand, the heat conducting component 3 may freely move back and forth with the movement of the lens tube 11, thus implementing the normal focusing function. In some embodiments, the thermal conductive spacer is a thermal conductive adhesive layer or a thermal conductive spacer.

In some embodiments, the first heat conducting section 31 usually extends along an axial direction of the lens component 1, and the second heat conducting section 32 extends along a radial direction of the lens component 1. In this case, the extension directions of the first heat conducting section 31 and the second heat conducting section 32 are perpendicular to each other, such that a cross section of the heat conductor is roughly "L" shaped. Thus, the contact area between the first heat conducting section 31 and the rear lens tube 112 and the contact area between the second heat conducting section 32 and the housing 21 of the optical components 2 are both very large, leading to a good heat conducting effect.

In some embodiments, the second heat conducting section 32 may be an annular or arc-shaped outer edge extending outward along the radial direction of the lens component 1. Thus, the second heat conducting section 32 can be arranged in different directions around the periphery of an outer side of the lens tube, such that heat of the lens tube may be dissipated in all directions using the second heat conducting section 32, so as to improve the heat dissipation capability and heat dissipation effect of the heat conducting component 3.

In some embodiments, the second heat conducting section 32 is located outside the housing 21, and the second heat conducting section 32 may be directly exposed to the outside air and heat exchanged with the outside air by convection, thereby releasing the heat captured in the lens tube to the outside. In this case, the second heat conducting section 32 may not be thermally connected with the heat dissipating structure of the optical components.

In some embodiments, since the end of the first heat conducting section 31 close to the optical shutter is located in the housing, and the side thereof away from the optical modulation element is located outside the housing 21, and the second heat conducting section 32 extends outward along the radial direction of the lens component 1, the second heat conducting section 32 is located outside the housing of the optical components 2. In this way, the second heat conducting section 32 transmits heat to the housing on the one hand, and on the other hand, exchanges heat with the outside air by convection, because the second heat conducting section 32 is directly exposed to the outside air. On this basis, the heat captured in the lens tube of the device may be quickly released to the outside.

In some embodiments, the second heat conducting section 32 contacts an inner side surface of the sidewall of the housing provided with a through hole 210, and in some embodiments, the second heat conducting section 32 contacts an outer side surface of the sidewall of the housing provided with a through hole 210.

In some embodiments, the housing 21 includes a first end face 211 facing a distal end of the lens component 1, and the second heat conducting section 32 may be connected to the first end face 211, so that the second heat conducting section 32 forms a thermal connection with the housing 21. The first end face 211 is the outer side surface of the sidewall of the housing provided with a through hole 210, and the distal end of the lens component is the end of the lens component 1 away from the optical modulation element.

The first end face 211 of the housing 21 faces the distal end of the lens component 1, i.e. a direction of light emission, so that the second heat conducting section 32 of the heat conductor extending outside along a radial direction of the lens component 1 is at a parallel or nearly parallel angle with the first end face 211; therefore, the second heat conducting section 32 has a large overlap area with the first end face 211. The structure of arranging the second heat conducting section 32 and the first end face 211 face to face may increase the relative area between the second heat conducting section 32 and the housing 21 and improve the heat dissipation efficiency.

In some embodiments, the first end face 211 of the housing 21 may be a smooth and flat surface. Thus, the first end face 211 of the housing 21 may achieve a good overlap and bonding effect with the second heat conducting section 32 to improve the heat dissipation efficiency.

In some embodiments, there is no direct contact between the second heat conducting section 32 and the first end face 211 of the housing 21, so that the rear lens tube 112 in the lens component 1 may be moved back and forth when the heat conducting component 3 is axially positioned and the projector device is focused on the projection screen. If the second heat conducting section 32 directly contacts the first end face 211 of the housing 21, on the one hand, it may be difficult for the second heat conducting section 32 to form good contact with the first end face 211 due to lack of good axial positioning of the heat conducting component 3, which can affect the heat transfer effect; on the other hand, the rear lens tube 112 in the lens component 1 may not be able to move back and forth when the projector device is focused on the projection screen, so some adjustment space is needed between the second heat conducting section 32 and the first end face 211. In the present embodiment, in the case that the second heat conducting section 32 does not directly contact the first end face 211 of the housing 21, to achieve heat conduction between the second heat conducting section 32 and the first end face 211 of the housing 21, the second heat conducting section 32 may be connected with the first end face 211 through a thermal conductive spacer. Thus, the thermal conductive spacer is connected between the second heat conducting section 32 and the first end face 211, that is, the thermal conductive spacer can transfer the heat of the second heat conducting section 32 to the first end face 211 of the housing 21, so that the heat conducting component 3 has high heat-dissipation efficiency.

The thermal conductive spacer may be made of a material with a high heat conduction velocity, or is a heat pipe or another structure that is easy to transfer heat, which is not limited here.

For example, as shown in FIG. 4, the thermal conductive spacer includes a heat conduction layer 4. The second heat conducting section 32 is in contact with one side of the heat conduction layer 4, while the other side of the heat conduction layer 4 is in contact with the first end face 211. The heat conduction layer 4 may thus be used as a heat conduction medium connecting the second heat conducting section 32 and the first end face 211 of the housing 21.

The heat conduction layer 4 may have various forms and structures. For example, the heat conduction layer 4 may be a graphite thermal conductive layer made of graphite, or may be made of other materials that are easy to conduct heat. Since the heat conduction layer 4 has good heat conduction velocity and good heat conduction efficiency, heat conduction efficiency between the second heat conducting section 32 and the housing 21 may be improved by arranging the heat conduction layer 4 between the second heat conducting section 32 and the first end face 211 of the housing 21.

Since one side of the heat conduction layer 4 is in contact with the second heat conducting section 32 and the other side of the heat conduction layer 4 is kept in contact with the first end face 211, good thermal conduction may be achieved between the heat conduction layer 4 and the second heat conducting section 32, and between the heat conduction layer 4 and the first end face 211 of the housing 21, thereby transferring the heat from the second heat conducting section 32 to the housing 21 of the optical components 2. Since the housing 21 of the optical components 2 is composed of metal and other materials with good thermal conductivity, it may realize rapid heat dissipation and improve the heat dissipation effect of the heat conducting component 3.

For example, in some embodiments, the heat conduction layer 4 is made of a deformable structure or material. Thus the second heat conducting section 32 of the heat conducting component 3 may have a certain gap with the first end face 211 of the housing 21, and the heat conduction layer 4 is filled in the gap. When the rear lens tube 112 in the lens component 1 moves back and forth, the heat conduction layer 4 may be deformed accordingly, so that the second heat conducting section 32 in the heat conducting component 3 is always thermally conductive with the first end face 211 of the housing 21 through the heat conduction layer 4, to ensure that the heat on the heat conducting component 3 may be normally dissipated and transmitted to the housing 21.

Besides, the thermal conductive spacer may also be another structure or material. For example, the thermal conductive spacer may be thermal conductive adhesive and so on. In general, thermal conductive adhesive may have a certain degree of elasticity, so if a distance between the second heat conducting section 32 and the first end face 211 of the housing 21 changes, the thermal conductive adhesive may be deformed accordingly, thus adapting to a current distance between the second heat conducting section 32 and the first end face 211 of the housing 21. For example, the thermal conductive adhesive may also have a certain adhesive force, allowing the second heat conducting section 32 to maintain contact with the first end face 211 of the housing 21, thus good heat conduction may be maintained between the second heat conducting section 32 and the housing 21.

In addition, the thermal conductive spacer may also be other structures and materials which may realize the heat conduction function and have certain deformation ability, which will not be elaborated here.

In some embodiments, as shown in FIG. 4, in order to fix the lens component 1 in the projector device, a lens base 5 arranged on the outer side of the lens tube may also be included in the projector device and configured to fix the lens tube onto the housing. Correspondingly, the second heat conducting section 32 may be located between the lens base 5 and the housing 21, and the second heat conducting section 32 is pressed on the housing 21 by the lens base 5.

The lens base 5 of the housing is located on a side of the housing 21 facing a distal end of the lens component 1, that is, on the side of the first end face 211 of the housing 21.

Normally, there is a gap between the lens base 5 and the housing 21 of the optical components 2, and the second heat conducting section 32 may be located in the gap between the lens base 5 and the housing 21 of the optical components 2. In order to abut the second heat conducting section 32 against the first end face 211 of the housing 21 through a thermal conductive spacer or other structure, the lens base 5 may exert a force to the second heat conducting section 32 towards the housing along an axial direction of the lens component 1, such that the second heat conducting section 32 is pressed on the housing 21 by the force, and in particular, on the first end face 211 of the housing 21.

Thus, the second heat conducting section 32 will be pressed onto the housing 21 by the force from the lens base 5, and reliable heat conduction may be achieved by contacting the housing 21 through the thermal conducive spacer or the like. Thus, the heat conducting component 3 may be used as a thermal conductive medium connecting the lens component 1 and the housing 21 of the optical components 2 to transfer heat from the lens tube to the housing 21 for dissipating heat of the lens component 1.

In some embodiments, to enable the lens base 5 to provide a force along the axial direction of the lens component 1 to the second heat conducting section 32, the lens base 5 may also have an end face facing the housing 21. In such an example, in order to distinguish the end faces of the lens base 5 and the housing 21, the end face of the housing 21 facing the lens base 5 may be named the first end face 211, and the end face of the lens base 5 facing the housing 21 may be named a second end face 51. Thus, the second heat conducting section 32 may be positioned between the first end face 211 and the second end face 51.

The second end face 51 on the lens base 5 is generally parallel to the first end face on the housing 21, and they are both perpendicular to the axial direction of the lens component 1. In this way, the second heat conducting section 32 may be firmly fixed between the lens base 5 and the housing 21, and the lens base 5 may use the second end face 51 to exert a force along the axial direction of the lens component 1 to the second heat conducting section 32, so that the second heat conducting section 32 is pressed on the first end face 211 of the housing 21, thereby achieving good contact and heat conduction.

Figure 6:
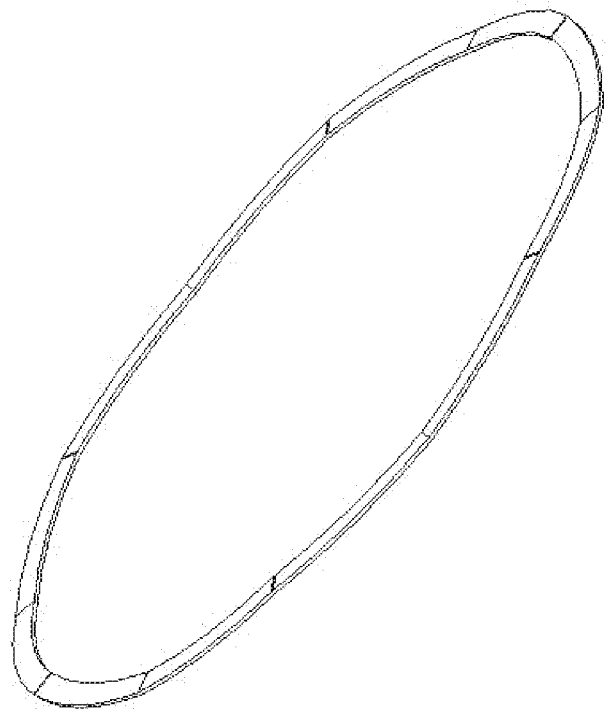
FIG. 6 is a schematic structural diagram of an elastomer provided in some embodiments of the present disclosure.
Figure 7:
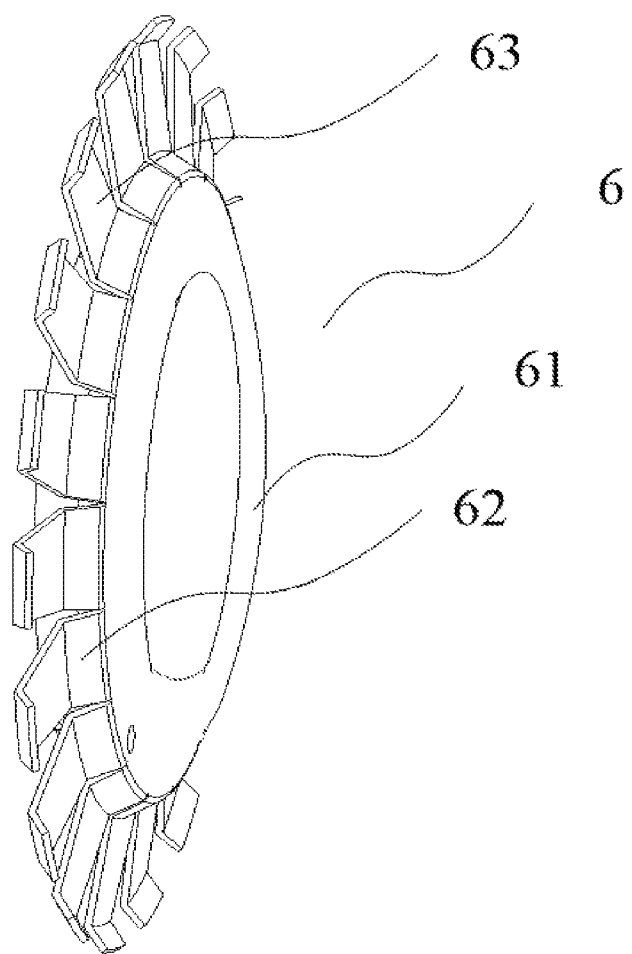
FIG. 7 is a schematic structural diagram of another elastomer provided in some embodiments of the present disclosure.

FIG. 6 and FIG. 7 are structural schematic diagrams of elastomer provided in some embodiments of the present disclosure. The elastomer may be a thermal conductive elastic spacer or other thermal conductive elastic structure. To exert a force to the second heat conducting section 32 of the heat conducting component 3, in some embodiments, an elastomer 6 may be provided between the lens base 5 and the second heat conducting section 32. In this way, the elastomer 6 may press the second heat conducting section 32 to the housing 21 of the optical components 2 using its own elastic force.

When the elastomer 6 is arranged between the lens base 5 and the second heat conducting section 32, on the one hand, the elastomer 6 may provide an elastic force for the second heat conducting section 32, so that there is good contact and heat conduction between the second heat conducting section 32 and the housing 21; on the other hand, the elastomer 6 itself may produce certain deformation, so it may be disposed in a gap between the lens base 5 and the second heat conducting section 32, and may be compressed or stretched following the axial movement of the lens tube when the lens component 1 zooms, thus being always connected between the lens base 5 and the second heat conducting section 32.

Since the second heat conducting section 32 is located outside the lens tube 11, in order to keep the second heat conducting section 32 in a circumferential connection with the lens base 5, the elastomer 6 may be, for example, an annular elastomer around the lens tube. Thus, both the elastomer surrounds the outside of the lens tube 11 like the second heat conducting section 32, so that parts of the second heat conducting section 32 are subjected to the force of the elastomer 6 and are pressed toward the side of the housing 21.

The elastomer 6 may be of various forms or structures. In one of the possible structures, the elastomer 6 may be springy sheet. The springy sheet itself is thin and has strong elasticity, so it may be inserted into the gap between the second heat conducting section 32 and the lens base 5. Two sides of the springy sheet are abutted against the second heat conducting section 32 and the lens base 5 respectively, and the second heat conducting section 32 may be pushed to the housing 21 of the optical components 2.

To generate elasticity, the springy sheet may also be of different forms or structures. For example, as shown in FIG. 7, the elastomer may include an annular body 61, a bending section 62 disposed around the annular body 61, a flat straight section 63 disposed at the end portion of the bending section 62 away from the body 61. The bending section 62 bends in a direction axially parallel to the lens tube as compared to the body 61, but the angle between the bending section 62 and the body 61 is not equal to 90 degrees. The plane where the flat straight section 63 is located is substantially parallel to the plane where the body 61 is located. The plane where the flat straight section 63 on the circumference of the elastomer 6 is located and the plane where the body 61 is located may be located on different planes perpendicular to the axial direction of the lens component 1, to abut against the lens base 5 or the second heat conducting section 32 respectively. In this case, the bending section 62 of the elastomer 6 causes a certain distance between the flat straight section 63 and the body 61 along the axial direction of the lens component 1. The body 61 is abutted against the second heat conducting section while the flat straight section 63 is abutted against the lens base 5, or the body 61 is abutted against the lens base 5 while the flat straight section 63 is abutted against the second heat conducting section 32. The elastomer 6 will deform under pressure when the gap between the lens base 5 and the second heat conducting section 32 changes. In this case, the height of each part of the elastomer 6 along the axial direction of the lens component 1 may change, and a reverse elastic force will correspondingly be generated by its own elasticity. The elastic force may push the second heat conducting section 32 to the housing 21 along the axial direction of the lens component 1.

In addition, the elastomer 6 may be of other structure or form capable of producing an elastic force. For example, it may be springy sheet with other structures, a spring, or an elastic block that are commonly used by those skilled in the art, which will not be elaborated here.

In some embodiments, the elastomer may be also located between the second heat conducting section 32 and the housing 21, and in this case the elastomer is a thermal conductive elastomer.

Figure 8:
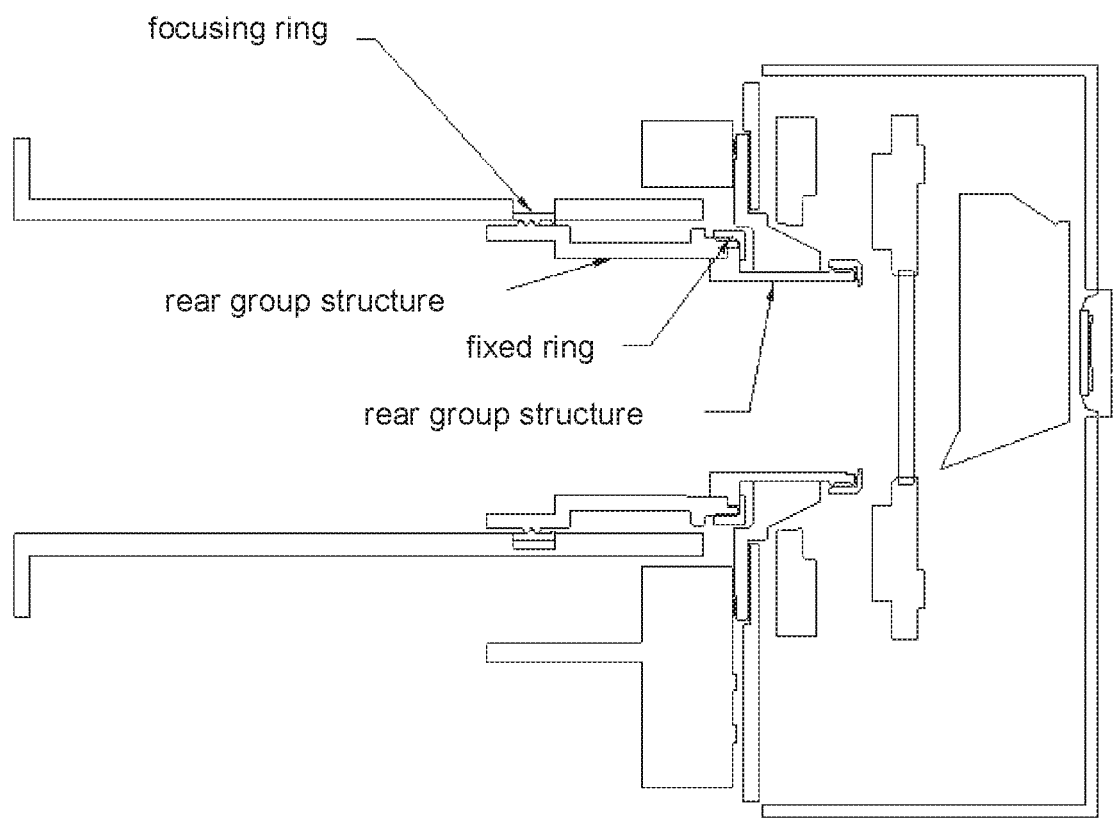
FIG. 8 is a partially enlarged view of FIG. 2b.

In some embodiments of the present disclosure, as shown in FIG. 8, the focusing ring rotates and drives the structural members of the rear lens group to move back and forth. To ensure that the heat conducting component may move back and forth following the rear lens group, the heat conducting component contacts the lens component via the springy sheet, and a compressible thermal conductive paste is arranged between the heat conducting component and the optical components.

In some embodiments, the relative positions of the rear lens tube 112, the heat conducting component 3, and the housing 21 remain unchanged, and the front lens tube 111 may be moved relative to the rear lens tube 112 during the focusing process, to adjust the focal length.

In the embodiments of the present disclosure, the heat conducting component is connected between the outer wall of the lens tube and the heat dissipating structure of the optical components to conduct the heat of the lens component to the heat dissipating structure. In this way, the heat conducting component may be used to transfer the heat of the lens component out to achieve heat dissipation, thus avoiding lens deformation caused by heat accumulation on the lens component, and ensuring correct imaging.

Some embodiments of the present disclosure provide a projector device including a metal housing, a Digital Micro Mirror Device (DMD) located in the metal housing, a plastic tube with lenses inside, and a metal heat conducting component. A first side wall of the metal housing is provided with a through hole, and the plastic tube is nested in the through hole. The DMD is disposed on an inner side of a second side wall of the metal housing, and the first side wall is disposed in opposition to the second side wall. The DMD is configured to modulate light beams that irradiate on the DMD to generate an imaging beam. A first end of the plastic tube is located in the inner of the housing and an opening of the first end of the plastic tube is configured to receive the imaging beam emitted from the DMD, a second end of the plastic tube is located outside the housing. A first end of the metal heat conducting component is disposed around part of the first end of the plastic tube, and a second end of the metal heat conducting component is connected with an outer surface of the first side wall of the metal housing. The first end of the metal heat conducting component is substantially extend along the axis of the plastic tube, and the second end of the metal heat conducting component is substantially extend vertical to the axis of the plastic tube.

In the description of the above embodiments, the specific features, structures, materials or characteristics can be combined in an appropriate manner in any one or more embodiments or examples.

The above embodiments are merely specific embodiments of the present disclosure, but the protection scope of the present disclosure is not limited thereto. Any person skilled in the art could readily conceive of changes or replacement within the technical scope of the present disclosure, which shall also be included in the protection scope of the present disclosure. Therefore, the protection scope of the present disclosure shall be determined by the protection scope of the claims.

What is claimed is:

1. A projector device, comprising:
   a housing, wherein a first side wall of the housing is provided with a through hole;
   an optical modulation element located in the housing;
   a lens tube with lenses inside; and
   a heat conducting component;
   wherein:
   the lens tube is nested in the through hole,
   a first end of the lens tube is located in the housing and is configured to receive light emitted from the optical modulation element,
   a first end of the heat conducting component is disposed on an outer wall of the first end of the lens tube, and a second end of the heat conducting component is connected with the housing;
   wherein:
   the lens tube includes at least one lens tube with a variable axial position;
   the heat conducting component is connected between the outer wall of the lens tube with a variable axial position and the housing, and the heat conducting component comprises:
   a first end configured to have a thermal conductive connection with the outer wall of the lens tube with a variable axial position, and
   a second end configured to have a thermal conductive connection with the housing when the lens tube with a variable axial position moves along an axial direction of the lens tube.

2. The projector device according to claim 1, wherein the heat conducting component includes at least one heat conductor that can conduct heat, and the at least one heat conductor is arranged around at least a part of a periphery of an outer wall of the lens tube; and
   wherein a first end of the heat conductor is in contact with the outer wall of the lens tube, and a second end of the heat conductor extends outward along a radial direction of the lens tube and is in contact with the housing.

3. The projector device according to claim 2, wherein the at least one heat conductor includes at least two heat conductors, and the at least two heat conductors are spliced into an annular piece; and
   wherein a connection between the at least two heat conductors is a removable connection.

4. The projector device according to claim 1, wherein the heat conducting component includes at least one heat conductor, and wherein a first end of the heat conductor includes a first heat conducting section arranged around an outer wall of the lens tube along a circumferential direction of the lens tube, and a second end of the heat conductor includes a second heat conducting section that extends outward along a radial direction of the lens tube.

5. The projector device according to claim 1, wherein the projector device further includes a thermal conductive spacer arranged between the heat conducting component and the housing, and the heat conducting component is connected with the housing through the thermal conductive spacer.

6. The projector device according to claim 5, wherein the thermal conductive spacer includes a heat conduction layer, the heat conducting component is in contact with a first side of the heat conduction layer, and a second side of the heat conduction layer is in contact with the first side wall of the housing.

7. The projector device according to claim 5, wherein the thermal conductive spacer includes a deformable thermal conductive spacer, and wherein the deformable thermal conductive spacer is arranged between the heat conducting component and the first side wall of the housing.

8. The projector device according to claim 7, wherein the deformable thermal conductive spacer is a flexible heat conduction layer or a thermal conductive elastic structure.

9. The projector device according to claim 4, wherein an outer side wall of the lens tube is provided with a lens base fixed to the housing, and wherein the lens base is arranged around the lens tube and configured to fix the lens tube onto the housing.

10. The projector device according to claim 9, wherein the lens base is disposed on a side of the heat conducting component away from the housing, and an elastomer is located between the lens base and the heat conducting component.

11. The projector device according to claim 10, wherein the elastomer is an annular elastomer around the lens tube.

12. The projector device according to claim 10, wherein the elastomer is springy sheet.

13. The projector device according to claim 10, wherein the elastomer includes:
   an annular body around the lens tube;
   a bending section disposed around the body;
   a flat straight section disposed at an end portion of the bending section away from the body; and
   a plane where the flat straight section is located is substantially parallel to a plane where the body is located;
   wherein the bending section bends toward a side of the body as compared with the body.

14. A projector device, comprising:
   a metal housing;
   a Digital Micro Mirror Device (DMD) located in the metal housing;
   a plastic tube with lenses inside; and
   a metal heat conducting component;
   wherein:
      a first side wall of the metal housing is provided with a through hole,
      the plastic tube is nested in the through hole,
      the DMD is disposed on an inner side of a second side wall of the metal housing,
      the first side wall is disposed in opposition to the second side wall,
      the DMD is configured to modulate light beams that irradiate on the DMD to generate an imaging beam,
      a first end of the plastic tube is located in the metal housing and configured to receive the imaging beam emitted from the DMD,
      a second end of the plastic tube is located outside the metal housing,
      a first end of the metal heat conducting component is disposed on an outer wall of the first end of the plastic tube, and
      a second end of the metal heat conducting component is connected with the first side wall of the metal housing.

15. The projector device according to claim 14, wherein the metal heat conducting component includes an upper metal heat conducting component and a lower metal heat conducting component, wherein the upper metal heat conducting component and the lower metal heat conducting component are spliced into an annular piece.

16. The projector device according to claim 15, wherein the first end of the metal heat conducting component includes a third end of the upper metal heat conducting component and a fourth end of the lower metal heat conducting component; and
   wherein the third end of the upper metal heat conducting component is arranged along a first portion of a circumference of the plastic tube, and the fourth end of the lower metal heat conducting component is arranged along a second portion of the circumference of the plastic tube.

17. The projector device according to claim 16, wherein the second end of the metal heat conducting component includes a fifth end of the upper metal heat conducting component connected with the first side wall of the metal housing and a sixth end of the lower metal heat conducting component connected with the first side wall of the metal housing.

18. The projector device according to claim 14, wherein:
   an outer side wall of the plastic tube is provided with a lens base arranged around at least a portion of the plastic tube and configured to fix the plastic tube onto the metal housing;
   the second end of the metal heat conducting component is arranged between the lens base and the first side wall; and
   an elastomer is provided between the lens base and the second end of the metal heat conducting component.

19. A projector device, comprising:
   a metal housing;
   a Digital Micro Mirror Device (DMD) located in the metal housing;
   a plastic tube with lenses inside; and
   a metal heat conducting component;
   wherein:
      a first side wall of the metal housing is provided with a through hole,
      the plastic tube is nested in the through hole,
      the DMD is disposed on an inner side of a second side wall of the metal housing,
      the first side wall is disposed in opposition to the second side wall,
      the DMD is configured to modulate light beams that irradiate on the DMD to generate an imaging beam,
      a first end of the plastic tube is located inside the metal housing,
      an opening of the first end of the plastic tube is configured to receive the imaging beam emitted from the DMD,
      a second end of the plastic tube is located outside the metal housing,
      a first end of the metal heat conducting component is disposed around part of the first end of the plastic tube,
      a second end of the metal heat conducting component is connected with an outer surface of the first side wall of the metal housing;
      the first end of the metal heat conducting component is substantially extend along an axis of the plastic tube, and
      the second end of the metal heat conducting component is substantially extend vertical to the axis of the plastic tube.

* * * * *